United States Patent [19]

Whalen et al.

[11] Patent Number: 5,671,946
[45] Date of Patent: Sep. 30, 1997

[54] APPARATUS FOR INFLATING A VEHICLE OCCUPANT PROTECTION DEVICE

[75] Inventors: Daniel D. Whalen, Gilbert, Ariz.; David L. Geyer, Shelby Township, Mich.; Gina H. Simpson, Mesa, Ariz.

[73] Assignee: TRW Vehicle Safety Systems Inc., Lyndhurst, Ohio

[21] Appl. No.: 608,139

[22] Filed: Feb. 28, 1996

[51] Int. Cl.⁶ .................................................. B60R 21/26
[52] U.S. Cl. ...................................................... 280/741
[58] Field of Search ...................................... 280/741, 748

[56] References Cited

U.S. PATENT DOCUMENTS

| | | | |
|---|---|---|---|
| 4,902,036 | 2/1990 | Zander et al. | 280/736 |
| 5,253,895 | 10/1993 | Bretfeld et al. | 280/736 |
| 5,294,414 | 3/1994 | Brede et al. | 422/305 |
| 5,308,370 | 5/1994 | Kraft et al. | 55/487 |
| 5,380,039 | 1/1995 | Emery et al. | 280/741 |
| 5,468,017 | 11/1995 | Kirsch et al. | 280/741 |
| 5,492,365 | 2/1996 | Bayley et al. | 280/741 |
| 5,507,520 | 4/1996 | Meduvsky et al. | 280/741 |

*Primary Examiner*—Kenneth R. Rice
*Attorney, Agent, or Firm*—Tarolli, Sundheim, Covell, Tummino & Szabo

[57] ABSTRACT

An apparatus (20) for supplying inflation fluid for inflating an inflatable vehicle occupant protection device comprises an enclosure (22) having a chamber (66) partially defined by an end wall portion (28) of the enclosure. A gas generating material (80) is located within the chamber (66) and spaced a distance from the end wall portion (28). The gas generating material (80) is ignitable at a first temperature. Auto-ignition material (180) is located within the chamber (66). The auto-ignition material (180) is ignitable at a second temperature below the first temperature. The auto-ignition material (180), when ignited, ignites the gas generating material (80). A filter element (70) is disposed between the gas generating material and the inflatable vehicle occupant protection device. A resilient member (140) is located within the chamber (66). The resilient member (140) has (i) a first portion (144) between the end wall portion (28) and the gas generating material (80) for inhibiting movement of the gas generating material relative to the enclosure (22), and (ii) a second portion (146) providing a seal between the filter element (70) and the end wall portion, said first portion having a passage (176) for directing the products of combustion of the auto-ignition material (180) against the gas generating material.

7 Claims, 2 Drawing Sheets

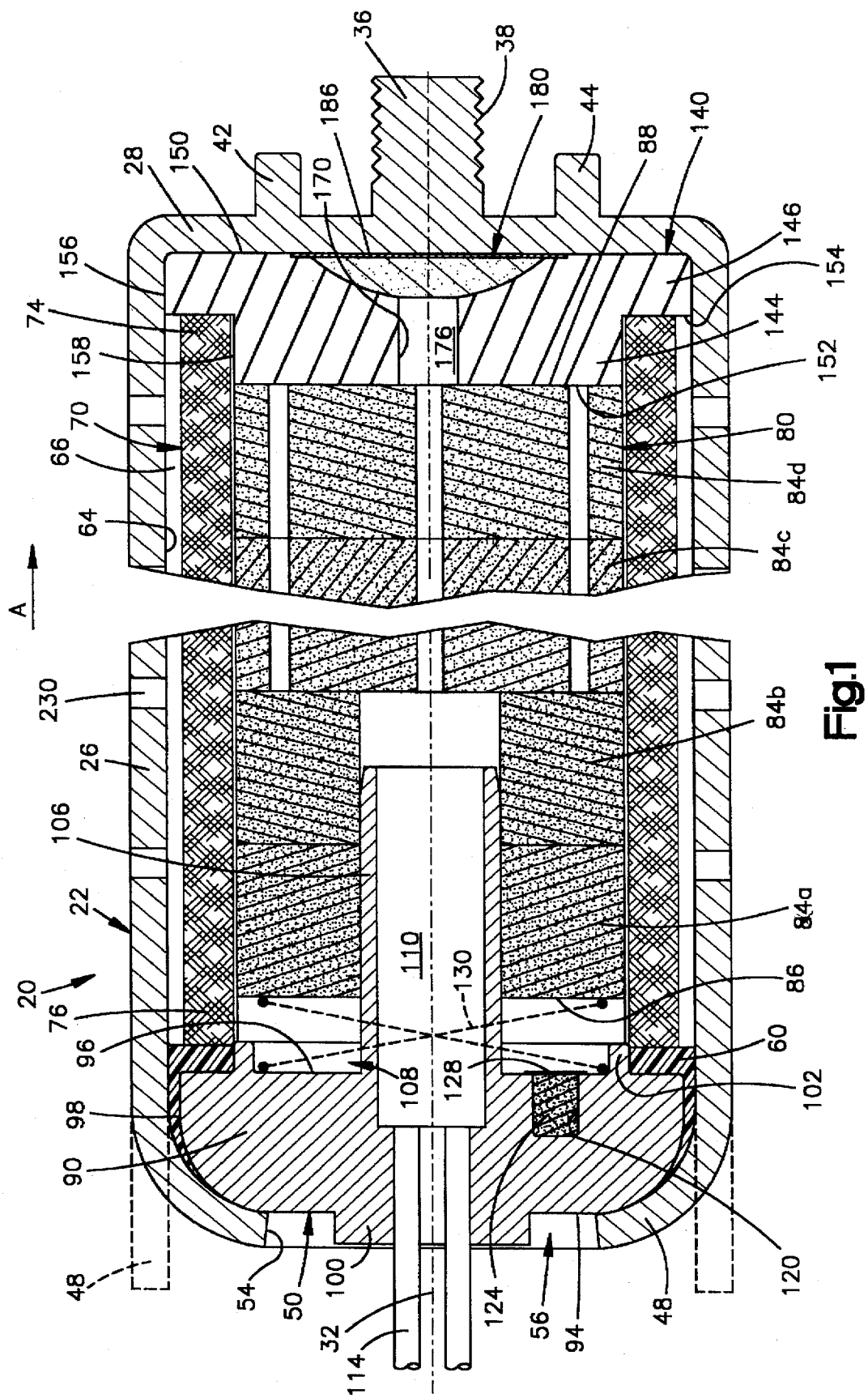

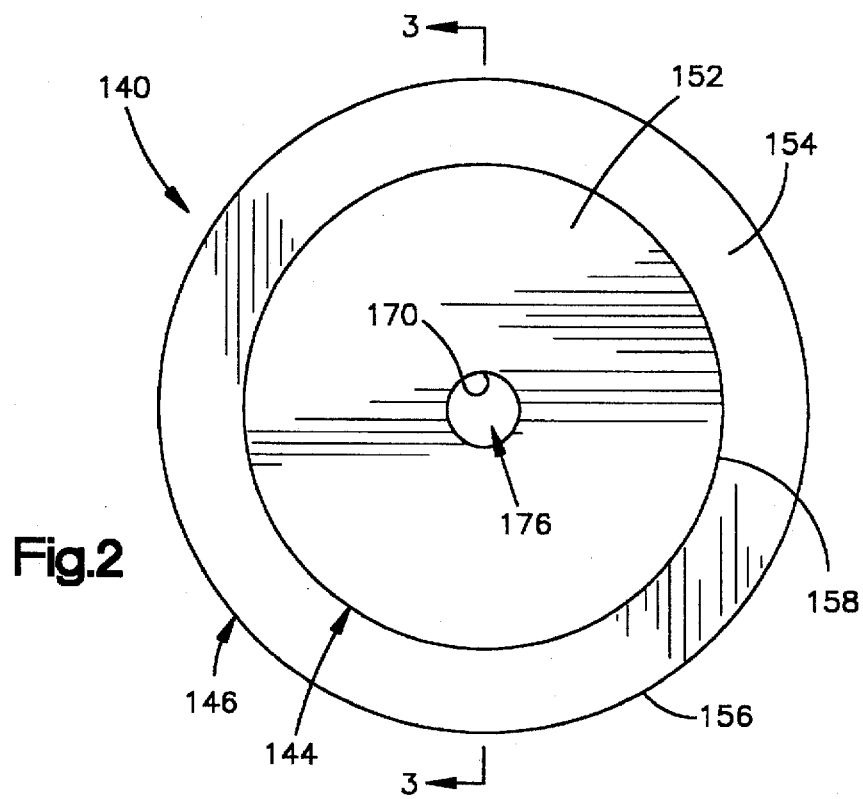
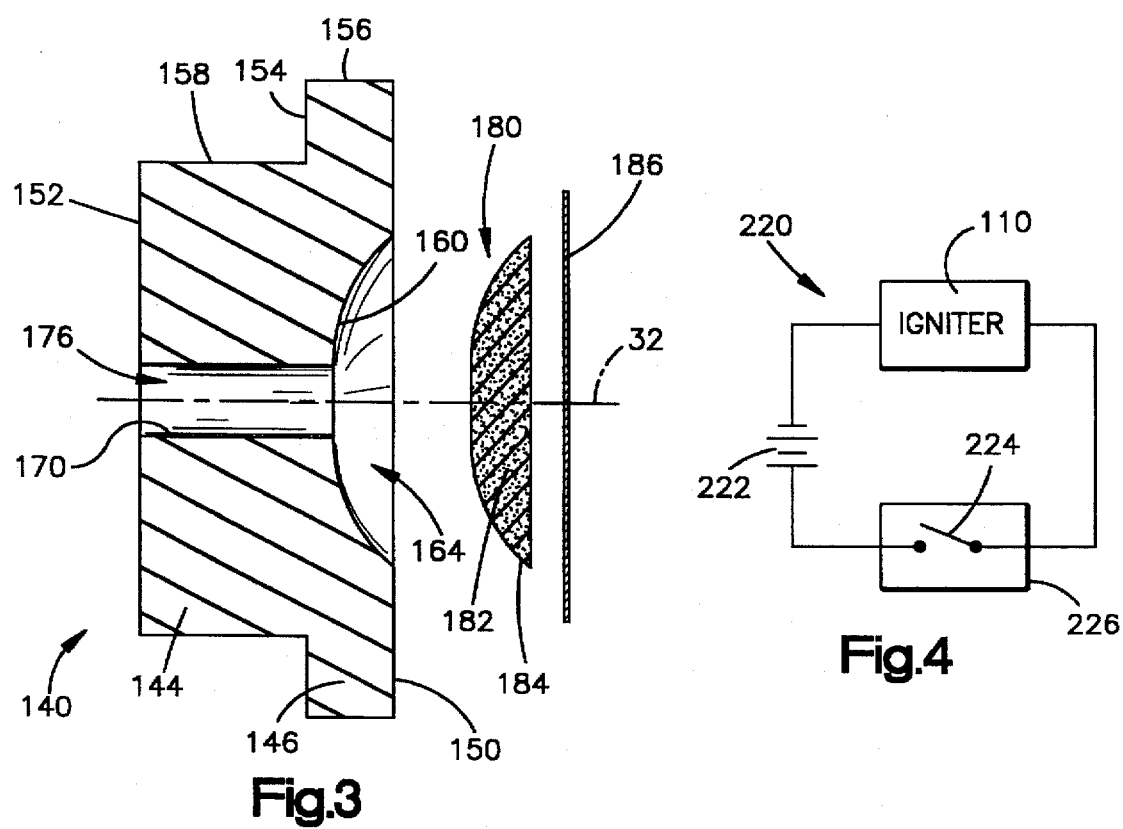

APPARATUS FOR INFLATING A VEHICLE OCCUPANT PROTECTION DEVICE

FIELD OF THE INVENTION

The present invention relates to an apparatus for inflating a vehicle occupant protection device such as an air bag.

BACKGROUND OF THE INVENTION

An inflatable vehicle occupant protection device, such as an air bag, typically is inflated by fluid flow from an inflator. The inflator contains a source of inflation fluid to inflate the air bag when the vehicle experiences a collision for which inflation of the air bag is desired to help protect an occupant of the vehicle. The source of inflation fluid may comprise a body of ignitable gas generating material.

SUMMARY OF THE INVENTION

The present invention relates to an apparatus for supplying inflation fluid for inflating an inflatable vehicle occupant protection device. The apparatus comprises an enclosure having a chamber partially defined by an end wall portion. A gas generating material is located within the chamber and spaced a distance from the end wall portion. The gas generating material is ignitable at a first temperature. The apparatus also includes auto ignition material ignitable at a second temperature below the first temperature. The auto ignition material, when ignited, ignites the gas generating material. A filter element is disposed between the gas generating material and the inflatable vehicle occupant protection device. A resilient member has (i) a first portion between the end wall portion and the gas generating material for inhibiting movement of the gas generating material relative to the enclosure, and (ii) a second portion providing a seal between the filter element and the end wall portion, said first portion having a passage for directing combustion products from ignition of the auto ignition material against the gas generating material.

BRIEF DESCRIPTION OF THE DRAWINGS

Further features of the present invention will become apparent to those skilled in the art to which the present invention relates from reading the following specification with reference to the accompanying drawings, in which:

FIG. 1 is a sectional schematic view of an inflator comprising a first embodiment of the present invention;

FIG. 2 is an enlarged view of a part shown in FIG. 1;

FIG. 3 is a view taken on line 3—3 of FIG. 2; and

FIG. 4 is a schematic view of an electrical circuit including a part of the inflator of FIG. 1.

DESCRIPTION OF PREFERRED EMBODIMENT

An inflator 20 comprising a first embodiment of the present invention is shown in FIG. 1. The inflator 20 supplies inflation fluid for inflating an inflatable vehicle occupant protection device (not shown), such as an air bag. The inflator 20 includes a cylindrical housing 22. The housing 22 includes an elongated tubular wall 26 and a circular end wall 28, each of which is centered on a longitudinal central axis 32. The end wall 28 closes one end of the cylindrical wall 26, and supports a plurality of mounting studs 36, 42 and 44 for mounting the inflator 20 in a reaction canister (not shown). The reaction canister is a known part which supports the inflator 20 in a vehicle (not shown).

The first mounting stud 36 is centered on the axis 32, and has a screw thread 38 for receiving a threaded fastener. The second and third mounting studs 42 and 44 are unthreaded, and are sized differently from each other so as to be receivable in respective alignment openings in the reaction canister. The second and third mounting studs 42 and 44 ensure that the inflator 20 will be installed in the reaction canister in a predetermined orientation.

The open end of the cylindrical wall 26 is closed by a circular closure cap 50 which is located within the cylindrical wall and is coaxial with the cylindrical wall. An end portion 48 of the cylindrical wall 26 has a dome-shaped contour, and extends closely over a dome-shaped portion of the closure cap 50. The end portion 48 of the cylindrical wall 26 further has an annular edge surface 54 which defines a circular opening 56 centered on the axis 32. An annular elastomeric seal 60 is compressibly engaged between the closure cap 50 and the end portion 48 of the cylindrical wall 26.

The cylindrical wall 26 of the housing 22 includes a cylindrical inner surface 64 defining a combustion chamber 66 in the housing. An elongated, annular filter 70 of known construction is disposed in the chamber 66 adjacent the inner surface 64 of the cylindrical wall 26 of the housing 22. The filter 70 has a first end 74 and a second end 76 opposite the first end.

A body 80 of gas generating material is disposed within the chamber 66 in the housing 22 radially inward of the filter 70. The body 80 of gas generating material comprises a plurality of separate, coaxial cylindrical grains 84a–d of gas generating material. Grain 84a has an axially outer end surface 86 facing in the direction of the closure cap 50. Grain 84d has an axially outer end surface 88 facing in the direction of the end wall 28 of the housing 22.

The grains 84a–d are formed of an ignitable, gas generating material which rapidly generates a large volume of inflation fluid in the form of gas when ignited. The ignitable, gas generating material may be of any suitable composition, and the grains 84a–d may have any suitable configuration. While FIG. 1 illustrates the grains 84a and 84b having a different configuration from the grains 84c and 84d, it is contemplated that the grains 84a–d could all have the same configuration or individually distinct configurations.

The closure cap 50 is preferably formed of aluminum, but may be formed of steel or any other suitable material known in the art. The closure cap 50 has a body portion 90 centered on the axis 32. The closure cap 50 has an axially outer end surface 94, facing in the direction away from the end wall 28, and an axially inner end surface 96 facing in the direction toward the end wall 28. A circumferentially extending peripheral surface 98 of the body portion 90 has an arcuate radial profile extending axially outward and radially inward from the inner end surface 96 to the outer end surface 94. A cylindrical portion 100 of the closure cap 50 projects a short distance axially away from the outer end surface 94 of the body portion 90. An annular portion 102 of the closure cap 50 projects axially inward a short distance from the inner end surface 96. A cylindrical barrel portion 106 of the closure cap 50 also projects axially inward from the inner end surface 96. The inner end surface 96, the annular portion 102, and the cylindrical barrel portion 106 cooperate to define a generally toroidal-shaped recess 108 in the closure cap 50. The recess 108 extends 360° around the barrel portion 106 of the closure cap 50.

An igniter 110 is secured in the barrel portion 106 of the closure cap 50. The igniter 110 is of known construction suitable to ignite the body 80 of gas generating material. Lead wires 114 extend outward from the igniter 110 through the closure cap 50.

An axially extending cavity 120 is formed in the body portion 90 of the closure cap 50. The cavity 120 receives a body 124 of auto ignition material, such as BKNO$_3$ or IMR (improved military rifle powder). The body 124 of auto ignition material is held in the cavity 120 by a strip 128 of metal foil which is adhered to the inner end surface 96 of the closure cap 50. The body 124 of auto ignition material ignites at a predetermined temperature, which is lower than the temperature at which the body 80 of gas generating material ignites. For example, the body 124 of auto ignition material may ignite at an ambient temperature below about 400° F., whereas the body 80 of gas generating material may ignite at a temperature of about 750° F.

A compression spring 130 of known construction is partially disposed within the recess 108 between the inner end surface 96 of the closure cap 50 and the axially outer end surface 86 of the grain 84a. The spring 130 is preferably a wave spring sold under the brand name SPIRAWAVE® by Smalley Steel Ring Company of Wheeling, Ill.

A generally cylindrical resilient, compressible spacer 140 is disposed in the housing 22 at the axially inner end, (i.e., at the right, as viewed in FIG. 1) of the combustion chamber 66. The spacer 140 abuts the end wall 28 of the housing 22. The spacer 140 also abuts the body 80 of gas generating material and the filter 70.

The spacer 140, as can best be seen in FIG. 3, has a main body portion 144 and a flange portion 146. The main body portion 144 has a circular, axially inner end surface 152 and a cylindrical side surface 158. The flange portion 146 has a circular outer end surface 150, larger in diameter than the inner end surface 152, a cylindrical side surface 156, larger in diameter than the cylindrical side surface 158, and an annular surface 154. The cylindrical side surface 158 is axially extending and connects surfaces 152 and 154. The cylindrical side surface 156 is also axially extending and connects surfaces 150 and 154. The annular surface 154 is radially extending and connects surfaces 156 and 158.

The spacer 140 has a dome-shaped surface 160 (FIG. 3) extending axially and radially inward from the outer end surface 150. The dome-shaped surface 160 defines a dome-shaped recess 164 within the flange portion 146 of the spacer 140.

The spacer 140 has a cylindrical inner surface 170 extending axially from the annular inner end surface 152 to the dome-shaped surface 160. The cylindrical inner surface 170 defines a cylindrical passage 176 extending axially through the spacer 140 and centered on the axis 32. The cylindrical passage 176 communicates with the dome-shaped recess 164.

The spacer 140 is cut, stamped, or otherwise formed from medium density fiber board. The fiber board may be made from various processes used to manufacture vitreous fiber paper or board. The fiber board comprises ceramic material and is preferably made of a blended mixture of amorphous (i.e., having a non-crystalline structure) fibers of aluminum oxide (Al$_2$O$_3$) and silicon dioxide (SiO$_2$). The fiber board may also contain conventional binder material such as a starch or latex binder. The fiber board may also contain various oxide additives to meet compression, temperature, and reactivity requirements.

A packet 180 (FIG. 1) of auto ignition material is disposed within the dome-shaped recess 164 of the spacer 140 on the longitudinal central axis 32 of the inflator 20. The packet 180 of auto ignition material is generally dome-shaped and contains a body 182 (FIG. 3) of auto ignition material wrapped in a fabric material 184. The packet 180 of auto ignition material is held in the dome-shaped recess 164 by a piece 186 (FIG. 1) of metal foil which is adhered to the outer end surface 150 of the spacer 140.

The fabric material 184 is preferably polypropylene. The body 182 of auto ignition material may be formed of any suitable auto ignition material, such as BKNO$_3$ or IMR, which ignites at a predetermined temperature, which is lower than the temperature at which the body 80 of gas generating material ignites. For example, the body 182 of auto ignition material may ignite at an ambient temperature below about 400° F. The combustion products emitted from the packet 180 of the auto ignition material are directed through the passage 176 of the spacer 140. Those combustion products move against the axially inner end surface 88 of the gas generating grain 84d to ignite the body 80 of gas generating material.

Assembly of the inflator 20 occurs in a series of steps which may, but need not, proceed in the following order. The spacer 140, with the packet 180 of auto ignition material secured within the domed shaped recess 164, is inserted into the chamber 66 of the housing 22. The outer end surface 150 is inserted first into the chamber 66 so that the outer end surface 150 of the spacer 140 and the piece 186 of metal foil abut the end wall 28 of the housing 22. The filter 70 is axially inserted into the chamber 66 of the housing 22 so that the first end 74 of the filter abuts the annular flange surface 154 of the flange portion 146 of the spacer 140. The body 80 of gas generating material is then axially inserted into the chamber 66 and located radially inward of the filter 70. The elastomeric seal 60 is axially inserted within the chamber 66 of the housing 22. The compression spring 130 and the closure cap 50 are axially inserted into the chamber 66 of the housing 22. As indicated in dashed lines in FIG. 1, the end portion 48 of the cylindrical wall 26 is initially cylindrical. The end portion 48 of the cylindrical wall 26 is deformed radially and axially inward over the closure cap 50 and the elastomeric seal 60. Such deformation of the end portion 48 can be accomplished with any suitable technique known in the art.

When the cylindrical wall 26 is deformed axially and radially inward against the closure cap 50, the spring 130 is pressed axially against the outer end surface 86 of the grain 84a and the axially inner end surface 96 of the closure cap 50. Thus, the spring 130 is compressed axially between the closure cap 50 and the body 80 of the gas generating material so as to exert a bias which urges the body of gas generating material against the main body portion 144 of the spacer 140. The spacer 140, specifically the main body portion 144 of the spacer, is compressed axially between the end wall 28 of the housing 22 and the axially inner end surface 88 of the grain 84d so as to exert a bias which urges the body 80 of gas generating material against the spring 130. The biases of the spring 130 and the main body portion 144 of the spacer 140 cooperate to hold the grains 84a–d of the body 80 of gas generating material together to keep the grains from moving relative to the housing 22. Since the spacer 140 is compressible, the spacer will compensate for any apparent excess length of the body 80 of gas generating material or filter 70 due to a stack-up of manufacturing tolerances. The spacer 140 will also remove ullage (i.e., the amount of space that prevents a container from being full) within the chamber 66 of the inflator 20.

Deforming the cylindrical wall 26 against the closure cap 50 also causes the elastomeric seal 60 to be compressed axially between the closure cap 50 and the filter 70 so as to exert a bias which urges the filter against the flange portion 146 of the spacer 140. The spacer 140, specifically the flange portion 146 of the spacer, is compressed axially between the filter 70 and the end wall 28 of the housing 22 so as to exert a bias which urges the filter against the elastomeric seal 60. The biases of the elastomeric seal 60 and the flange portion 146 of the spacer 140 cooperate to hold the filter 70 securely within the housing 22.

The igniter 110 is included in an electrical circuit 20, as shown schematically in FIG. 4, when the inflator 20 (FIG. 1) is installed in a vehicle. The electrical circuit 20 (FIG. 4) further includes a power source 222, which is preferably the vehicle battery and/or a capacitor, and a normally open switch 224. As known in the art, the switch 224 is part of a sensor 226 which senses a vehicle condition indicating the occurrence of a vehicle collision. The collision-indicating condition may comprise, for example, sudden vehicle deceleration that is caused by a collision. If the collision-indicating condition is above a predetermined threshold level, it indicates the occurrence of a collision having a level of severity for which inflation of the inflatable device is desired for protection of a vehicle occupant. The switch 224 closes when the sensor 226 senses such a collision-indicating condition.

When the switch 224 in the circuit 220 is closed, electric current is directed through the igniter 110 between the lead wires 114 (FIG. 1). The igniter 110 generates combustion products which are spewed into the housing 22 to ignite the grains 84a–d of the body 80 of gas generating material in the housing 22. The grains 84a–d, when ignited, produce a large volume of gas.

The combustion chamber 66 is fully closed and sealed at its axially opposite ends by the closure cap 50, the elastomeric seal 60, the spacer 140, and the end wall 28. This constrains the gas to flow outward from the combustion chamber 66 only through the filter 70. The filtered gas then emerges from the inflator 20 through a plurality of outlet openings 230 in the cylindrical wall 26 of the housing 22. The gas is directed from the inflator 20 to the inflatable vehicle occupant protection device by a reaction canister (not shown) and/or by a diffuser (not shown) as known in the art. The gas inflates the protection device to help protect a vehicle occupant from forcibly striking parts of a vehicle.

From the above description of the invention, those skilled in the art will perceive improvements, changes and modifications. For instance, the inflator 20 could have a spacer, similar in construction to spacer 140, disposed adjacent to the closure cap 50 either in addition to or in lieu of the spacer 140. Also, the spacer 140 is not limited merely to use with the inflator 20 described above. The spacer 140 can also be used with any other type of pyrotechnic inflator used for supplying gas to inflate an inflatable vehicle occupant protection device. Such improvements, changes and modifications within the skill of the art are intended to be covered by the appended claims.

Having described the invention, the following is claimed:

1. Apparatus for supplying inflation fluid for inflating an inflatable vehicle occupant protection device, said apparatus comprising:

an enclosure having a chamber partially defined by an end wall portion of said enclosure;

gas generating material within said chamber and spaced a distance from said end wall portion, said gas generating material being ignitable at a first temperature;

auto-ignition material ignitable at a second temperature below said first temperature, said auto-ignition material, when ignited, igniting said gas generating material;

a filter element disposed between said gas generating material and the inflatable vehicle occupant protection device; and a resilient member having (i) a first portion between said end wall portion and said gas generating material for inhibiting movement of said gas generating material relative to said enclosure, and (ii) a second portion providing a seal between said filter element and said end wall portion, said first portion having a passage for directing the combustion products from ignition of said auto-ignition material against said gas generating material.

2. An apparatus as defined in claim 1 wherein said resilient member has surface means for defining a recess in said resilient member and said auto-ignition material is disposed within said recess in said resilient member adjacent to said passage.

3. An apparatus as defined in claim 2 wherein said passage in said resilient member communicates with said recess in said resilient member.

4. An apparatus as defined in claim 1 wherein said resilient member is made from fiber board.

5. An apparatus as defined in claim 4 wherein said fiber board comprises a ceramic material.

6. An apparatus as defined in claim 5 wherein said ceramic material comprises a blend of aluminum oxide and silicon dioxide.

7. An apparatus as defined in claim 6 wherein said aluminum oxide and silicon dioxide have an amorphous structure.

* * * * *